(12) United States Patent
Heckerman et al.

(10) Patent No.: US 6,260,011 B1
(45) Date of Patent: Jul. 10, 2001

(54) METHODS AND APPARATUS FOR AUTOMATICALLY SYNCHRONIZING ELECTRONIC AUDIO FILES WITH ELECTRONIC TEXT FILES

(75) Inventors: David E. Heckerman, Bellevue; Fileno A. Alleva, Redmond; Robert L. Rounthwaite, Fall City; Daniel Rosen, Bellevue; Mei-Yuh Hwang, Redmond; Yoram Yaacovi, Redmond; John L. Manferdelli, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/531,054

(22) Filed: Mar. 20, 2000

(51) Int. Cl.[7] .......................... G10L 15/08; G10L 15/26; G10L 11/06

(52) U.S. Cl. .......................... 704/235; 704/231; 704/251; 704/254; 704/278

(58) Field of Search .................................... 704/260, 252, 704/270.1, 270, 243, 231, 236, 278, 238

(56) References Cited

U.S. PATENT DOCUMENTS

| | | | |
|---|---|---|---|
| 3,700,815 | * 10/1972 | Doddington et al. | 704/246 |
| 4,779,209 | * 10/1988 | Stapleford et al. | 704/278 |
| 5,008,871 | * 4/1991 | Howells et al. | 369/28 |
| 5,333,275 | * 7/1994 | Wheatley et al. | 704/243 |
| 5,649,060 | * 7/1997 | Ellozy et al. | 704/278 |
| 5,737,725 | * 4/1998 | Case | 704/270 |
| 5,758,024 | 5/1998 | Alleva | 395/63 |
| 5,794,197 | 8/1998 | Alleva et al. | 704/255 |
| 5,960,447 | * 9/1999 | Holt et al. | 704/235 |
| 6,076,059 | * 6/2000 | Glickman et al. | 704/260 |

OTHER PUBLICATIONS

Hauptmann et al, "Story Segmentation & Detection of Commercials in roadcast News Video", Research & Technology Advances in Digital Libraries, Apr. 24, 1998.*

Pedro J Moreno, Chris Joerg, Jean–Manuel Van Thong, and Oren Glickman, "A Recursive Algorithm for the Forced Alignment of Very Long Audio Segments"; Cambridge Research Laboratory, pp. 1–4, Nov. 20, 1998.

Lawrence Rabiner and Biing–Hwang Juang, *Fundamentals of Speech Recognition*, pp. 434–495 (1993).

* cited by examiner

*Primary Examiner*—Richemond Dorvil
*Assistant Examiner*—Daniel A. Nolan
(74) *Attorney, Agent, or Firm*—Straub & Pokotylo; Michael P. Straub (57) ABSTRACT

Automated methods and apparatus for synchronizing audio and text data, e.g., in the form of electronic files, representing audio and text expressions of the same work or information are described. A statistical language model is generated from the text data. A speech recognition operation is then performed on the audio data using the generated language model and a speaker independent acoustic model. Silence is modeled as a word which can be recognized. The speech recognition operation produces a time indexed set of recognized words some of which may be silence. The recognized words are globally aligned with the words in the text data. Recognized periods of silence, which correspond to expected periods of silence, and are adjoined by one or more correctly recognized words are identified as points where the text and audio files should be synchronized, e.g., by the insertion of bi-directional pointers. In one embodiment, for a text location to be identified for synchronization purposes, both words which bracket, e.g., precede and follow, the recognized silence must be correctly identified. Pointers, corresponding to identified locations of silence to be used for synchronization purposes are inserted into the text and/or audio files at the identified locations. Audio time stamps obtained from the speech recognition operation may be used as the bi-directional pointers. Synchronized text and audio data may be output in a variety of file formats.

36 Claims, 9 Drawing Sheets

METHODS AND APPARATUS FOR AUTOMATICALLY SYNCHRONIZING ELECTRONIC AUDIO FILES WITH ELECTRONIC TEXT FILES

FIELD OF THE INVENTION

The present invention relates to methods and apparatus for synchronizing electronic audio and text data in an automated manner, and to using the synchronized data, e.g., audio and text files.

BACKGROUND OF THE INVENTION

Historically, books and other literary works have been expressed in the form of text. Given the growing use of computers, text is now frequently represented and stored in electronic form, e.g., in the form of text files. Accordingly, in the modern age, users of computer devices can obtain electronic copies of books and other literary works.

Frequently text is read aloud so that the content of the text can be provided to one or more people in an oral, as opposed to written, form. The reading of stories to children and the reading of text to the physically impaired are common examples where text is read aloud. The commercial distribution of literary works in both electronic and audio versions has been commonplace for a significant period of time. The widespread availability of personal computers and other computer devices capable of displaying text and playing audio files stored in electronic form has begun to change the way in which text versions of literary works and their audio counterparts are distributed.

Electronic distribution of books and other literary works in the form of electronic text and audio files can now be accomplished via compact discs and/or the Internet. Electronic versions of literary works in both text and audio versions can now be distributed far more cheaply than paper copies. While the relatively low cost of distributing electronic versions of a literary work provide authors and distributors an incentive for distributing literary works in electronic form, consumers can benefit from having such works in electronic form as well.

Consumers may wish to switch between audio and text versions of a literary work. For example, in the evening an individual may wish to read a book. However, on their way to work, the same individual may want to listen to the same version of the literary work from the point, e.g., sentence or paragraph, where they left off reading the night before. Consumers attempting to improve their reading skills can also find text and audio versions in the form of electronic files beneficial. For example, an individual attempting to improve his/her reading skills may wish to listen to the audio version of a book while having text corresponding to the audio being presented highlighted on a display device. Also, many vision-impaired or hearing-impaired readers might benefit from having linked audio and text versions of the literary work.

While electronic text and audio versions of many literary works exist, relatively few of these works include links between the audio and text versions needed to support the easy accessing of the same point in both versions of a work. Without such links between the text and audio versions of a work, it is difficult to easily switch between the two versions of the work or to highlight text corresponding to the portion of the audio version being played at a given moment in time.

Links or indexes used to synchronize audio and text versions of the same work may be manually generated via human intervention. However, such human involvement can be costly and time consuming. Accordingly, there is a need for methods and apparatus for automating the synchronization of electronic text and audio versions of a work.

Previous attempts to automate the synchronization of electronic text files and audio files of the same work have focused primarily on the indexing of audio files corresponding to radio and other broadcasts with electronic text files representing transcripts of the broadcasts. Such indexing is designed to allow an individual viewing an excerpt from a transcript over the Internet to hear an audio clip corresponding to the excerpt. In such applications, the precision required in the alignment is often considered not to be critical and an error in alignment of up to 2 seconds is considered by some to be acceptable.

While the task of aligning audio files corresponding to TV and radio broadcasts and text transcripts of the broadcasts is similar in nature to the task of aligning text files of books or other literary works with audio versions made there from, there are important differences between the two tasks which arise from the differing content of the files being aligned and the ultimate use of the aligned files.

In the case of recordings of literary and other text documents which are read aloud and recorded for commercial purposes, a single reader is often responsible for the reading of the entire text. The reader is often carefully chosen by the company producing the audio version of the literary work for proper pronunciation, inflection, general understandability and overall accuracy. In addition, audio recordings of books and other literary works are normally generated in a sound controlled environment designed to keep background noise to a minimum. Thus commercial audio versions of books or other literary works intended to be offered for sale, either alone or in combination with a text copy, are often of reasonably good quality with a minimum of background noise. Furthermore, they tend to accurately reflect the punctuation in the original work and, in the case of commercial audio versions of literary works, a single individual may be responsible for the audio versions of several books or stories since commercial production companies tend to use the same reader to produce the audio versions of multiple literary works, e.g., books.

In the case of transcripts produced from, e.g., radio broadcasts, television broadcasts, or court proceedings, multiple speakers with different pronunciation characteristics, e.g., accents, frequently contribute to the same transcript. Each speaker may contribute to only a small portion of the total recording. The original audio may have a fair amount of background noise, e.g., music or other noise. In addition, in TV and radio broadcasts, speech from multiple speakers may overlap, making it difficult to distinguish the end of a sentence spoken by one speaker and the start of a sentence from a new speaker. Furthermore, punctuation in the transcript may be less accurate then desired given that the transcript may be based on unrehearsed conversational speech generated without regard to how it might later be transcribed using written punctuation marks.

In the case of attempting to synchronize text and audio versions of literary works, given the above discussed uses of such files, accurately synchronizing the starting points of paragraphs and sentences is often more important than being able to synchronize individual words within sentences.

In view of the above discussion, it is apparent that there is a need for new methods and apparatus which can be used to accurately synchronize audio and text files. It is desirable that at least some methods and apparatus be well suited for synchronizing text and audio versions of literary works. It is also desirable that the methods and apparatus be capable of synchronizing the starting points of sentences and/or paragraphs in audio and text files with a high degree of accuracy.

SUMMARY OF THE PRESENT INVENTION

The present invention is directed to methods and apparatus for automatically generating synchronized audio and text data, e.g., files, from unsynchronized electronic audio and text versions of the same work, e.g., literary work, program or document.

The synchronization of long audio files, e.g. 30 minutes and longer with corresponding text in an automated manner, presents significant difficulties since absolute certainty as to points in the audio and text versions which correlate to each other exists only at the beginning and end of the complete text and audio versions of the same work.

When synchronizing text and audio versions of the same work, it is highly desirable to synchronize at least one point per paragraph, preferably at the start of each paragraph. When positions within a paragraph are also to be synchronized, the start of sentences is a particularly useful location to synchronize since people tend to prefer reading or listening to speech from the start, as opposed to the middle, of sentences.

The inventors of the present invention recognized that silence normally occurs at the ends of paragraphs and sentences but, for the most part, does not occur between words within a sentence during ordinary speech. They also recognized that in many audio versions of literary works and other text documents read aloud, the amount of background noise is intentionally kept to a minimum. This makes periods of silence in an audio version of a literary work relatively easy to detect. In addition, the locations where silence occurs is relatively easy to predict from punctuation and/or other content within the text version of the work.

Given that silence may occur within a sentence in an audio version of a literary work, e.g., because of a pause by the reader which is not reflected in the text by punctuation, the detection of periods of silence alone may be insufficient to reliably synchronize audio and text versions of a literary work. This is particularly the case in long audio sequences.

The inventors of the present application recognized that by performing speech recognition, spoken words in an audio work, in addition to periods of silence, could be detected automatically and used for purposes of synchronizing the text and audio versions of the work. Unfortunately, with known speech recognition techniques, recognition errors occur. In addition, even when recognition errors do not occur, differences may exist between an audio and text version of the same work due, e.g., to reading errors on the part of the individual or individuals responsible for generating the audio version of the work.

The present invention uses a combination of silence detection and detection of actual words for purposes of synchronizing audio and text versions of the same work.

In accordance with the present invention, a speech recognition operation is performed on an audio corpus to recognize actual words and periods of silence. For speech recognition purposes silence may be modeled as a word. A time indexed set of recognized words and periods of silence is produced by the speech recognition process of the present invention. The results of the speech recognition operation are globally aligned with the text corpus by matching as much of the recognized text as possible to the corresponding text of the work without changing the sequence of the recognized or actual text.

When periods of detected silence correspond to expected locations within the actual text, e.g., ends of sentences and paragraphs, one or more words adjoining the period of silence in the recognized text are compared to one or more corresponding words adjoining the expected location of silence in the actual text. If the words adjoining the text were properly recognized, both the recognized word or words adjoining the silence and the actual word or words adjoining the expected point of silence will match. When there is a match, the identified location of the silence in the audio file and the corresponding location in the text file are identified as corresponding audio and text locations where a pointer correlating the two files should be inserted.

In one particular embodiment, for a location corresponding to detected silence to be used for purposes of file synchronization, the recognized words bracketing i.e., preceding and following, the detected silence must be properly recognized, e.g., match, the words in the actual text bracketing the location believed to correspond to the detected silence.

When a location in a text file corresponding to detected silence is identified for purposes of file synchronization, a pointer to the recognized silence in the audio file is added at the location in the text file having been identified as corresponding to the recognized silence. This results in the ends of sentences and/or paragraphs being synchronized in the text file with corresponding occurrences of silence in the audio file.

Each pointer added to the text file may be, e.g., a time index or time stamp into the corresponding audio file. A similar pointer, e.g., time index or stamp, may be added to the audio file if the corresponding audio file does not already include such values.

Pointers inserted into the audio and text files for synchronization purposes may take on a wide range of forms in addition to time stamp values. For example, pointers may include a filename or file identifier in conjunction with an index value used to access a particular point within the identified file. In such cases, the pointers added to audio files may include a file name or file identifier which identifies the corresponding text file. Pointers added to the text files in such embodiments may include a file name or file identifier which identifies the corresponding audio file.

As part of the speech recognition process of the present invention, statistical language models, generated from the text corpus to be synchronized, may be used. Statistical language models, e.g., tri-gram language models, predict the statistical probability that a hypothesized word or words will occur in the context of one or more previously recognized words. Since the synchronization of audio and text files in accordance with the present invention relies heavily on the accurate identification of silence in the context of preceding and/or subsequent words, it was recognized that statistical language models, as opposed to simple language models, were more likely to produce recognition speech results that were useful in synchronizing audio and text files based on the detection of silence in the context of expected words. In accordance with the present invention, statistical language models are generated from the text corpus which is to be synchronized with a corresponding audio corpus.

While the use of statistical language models for speech recognition purposes is one feature of the present invention, it is recognized that other types of language models may be employed instead without departing from the overall invention.

Numerous additional features and advantages of the present invention will be discussed in the detailed description which follows.

DETAILED DESCRIPTION

As discussed above, the present invention is directed to methods and apparatus for automatically synchronizing electronic audio and text data, e.g., files, corresponding to the same work, e.g., literary work, radio program, document or information.

Figure 1:
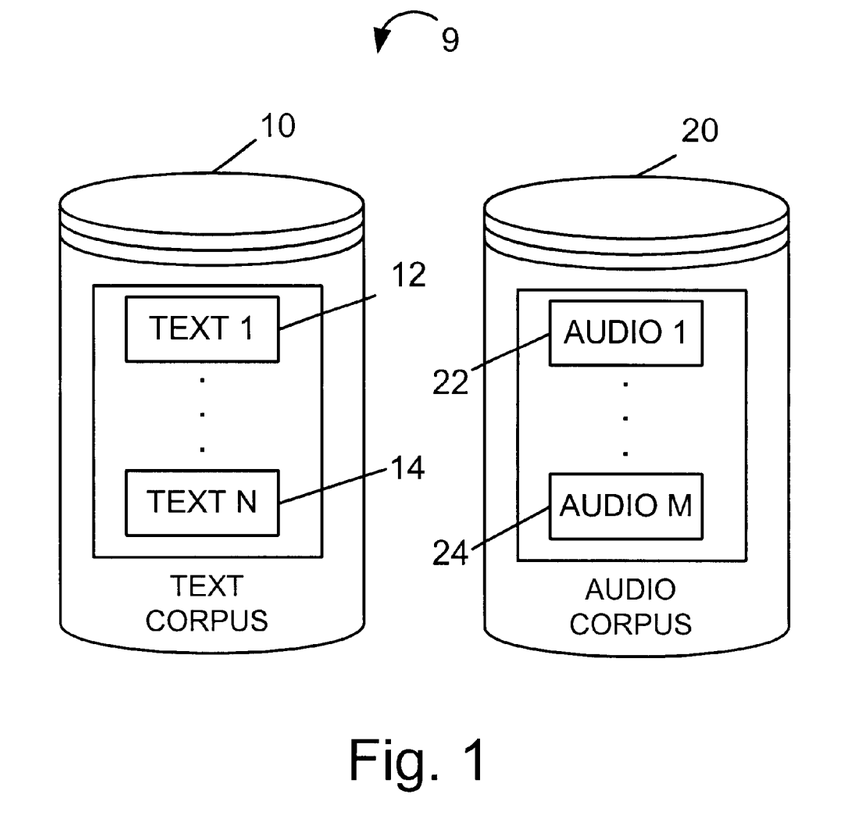
FIG. 1 illustrates unsynchronized electronic text and audio corpuses corresponding to the same exemplary literary work.

FIG. 1 illustrates a set 9 of unsynchronized text and audio files corresponding to, e.g., the same exemplary literary work. A plurality of N text files 12, 14 form a text corpus 10 which represents the complete text of the exemplary literary work. Text files 12, 14 may be in any one of a plurality of electronic formats, e.g., an ASCII format, used to store text information. A plurality of M audio files 22, 24 form an audio corpus 20 which represents a complete audio version of the exemplary work. Audio files 22, 24 may be in the form of WAVE or other electronic audio file formats used to store speech, music and/or other audio signals. Note that the number N of text files which form the text corpus 10 may be different than the number M of audio files which form the audio corpus 20.

While the text corpus 10 and audio corpus 20 correspond to the same literary work, the audio and text files are unsynchronized, that is, there are no links or reference points in the files which can be used to correlate the informational content of the two files. Thus, it is not possible to easily access a point in the audio corpus 20 which corresponds to the same point in the literary work as a point in the text corpus 20. This makes it difficult to access the same location in the literary work when switching between text and audio modes of presenting the literary work.

Figure 2:
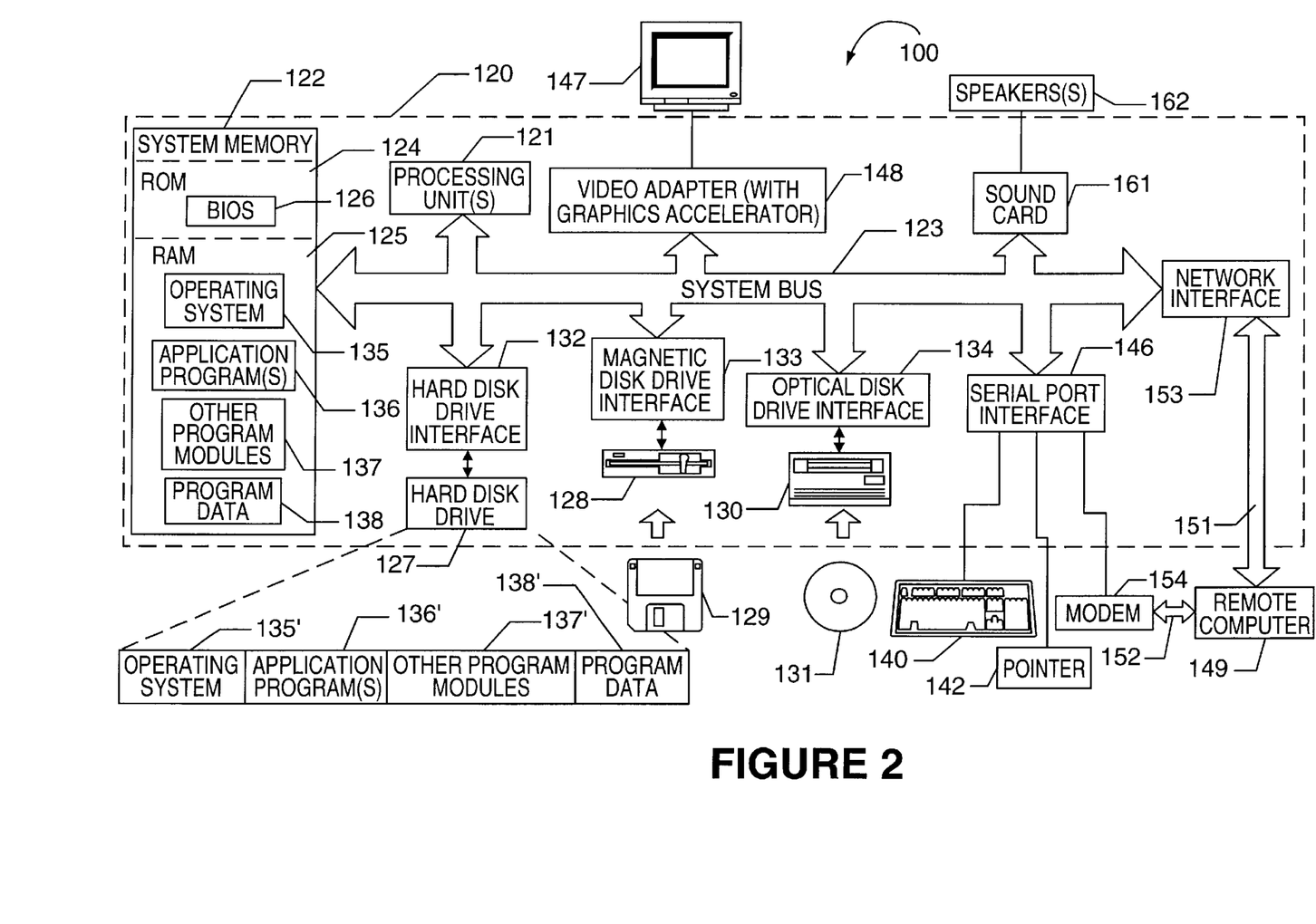
FIG. 2 illustrates a computer system implemented in accordance with one embodiment of the present invention.

FIG. 2 and the following discussion provide a brief, general description of an exemplary apparatus, e.g., computer system, in which at least some aspects of the present invention may be implemented. The computer system may be implemented as a portable device, e.g., notebook computer or a device for presenting books or other literary works stored in electronic form.

The present invention will be described in the general context of computer-executable instructions, such as program modules, being executed by a personal computer. However, the methods of the present invention may be effected by other apparatus. Program modules may include applications, routines, programs, objects, components, data structures, etc. that perform a task(s) or implement particular abstract data types. Moreover, those skilled in the art will appreciate that at least some aspects of the present invention may be practiced with other configurations, including handheld devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 2, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an (magneto-) optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile storage of machine readable instructions, data structures, program modules and other data for the personal computer 120. Although the exemplary environment described herein employs a hard disk, a removable magnetic disk 129 and a removable(magneto) optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125. In FIG. 2 an operating system 135, one (1) or more application programs 136, other program modules 137, and/or program data 138 are shown as being stored in RAM 125. Operating system 135', application program(s) 136', other program modules 137' and program data 138' are shown as being stored on hard disk driver 127. As will be discussed below in regard to FIG. 3, in the exemplary embodiment the application programs include an audio/text synchronization program implemented in accordance with the present invention. In addition, program data 138 described in further detail with regard to FIG. 4, includes an acoustic model and other data used by the audio/text synchronization program 308 of the present invention.

A user may enter commands and information into the personal computer 120 through input devices, such as a keyboard 140 and pointing device 142 for example. Other input devices (not shown) such as a microphone, joystick, game pad, satellite dish, scanner, or the like may also be included. These and other input devices are often connected to the processing unit 121 through a serial port interface 146 coupled to the system bus. However, input devices may be connected by other interfaces, such as a parallel port, a game port or a universal serial bus (USB). A monitor 147 or other type of display device may also be connected to the system bus 123 via an interface, such as a video adapter 148 for example. In addition to the monitor, the personal computer 120 may include a sound card 161 coupled to speaker(s) 162 and other peripheral output devices (not shown), such as printers for example.

The personal computer 120 may operate in a networked environment which defines logical connections to one (1) or more remote computers, such as a remote computer 149. The remote computer 149 may be another personal computer, a server, a router, a network PC, a peer device or other common network node, and may include many or all of the elements described above relative to the personal computer 120. The logical connections depicted in FIG. 1A include a local area network (LAN) 151 and a wide area network (WAN) 152, an intranet and the Internet.

When used in a LAN, the personal computer 120 may be connected to the LAN 151 through a network interface adapter (or "NIC") 153. When used in a WAN, such as the Internet, the personal computer 120 may include a modem 154 or other means for establishing communications over the wide area network 152. The modem 154, which may be internal or external, may be connected to the system bus 123 via the serial port interface 146. In a networked environment, at least some of the program modules depicted relative to the personal computer 120 may be stored in a remote memory storage device. The network connections shown are exemplary and other means of establishing a communications link between the computers may be used.

Figure 3:
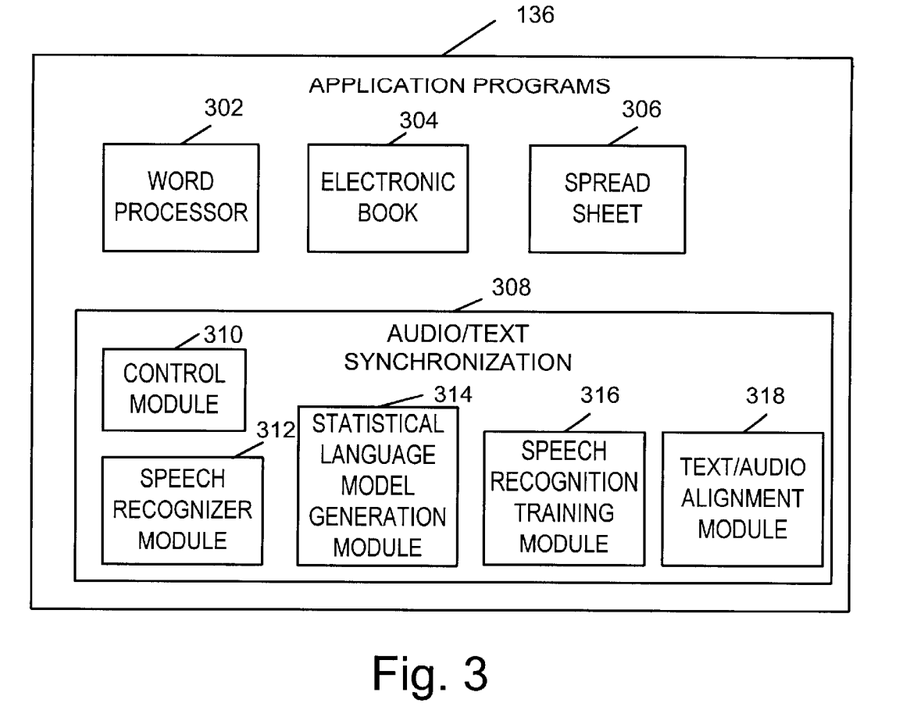
FIG. 3 illustrates a set of application programs included in the computer system of FIG. 2.

FIG. 3 illustrates the set of application programs 136 stored in the memory 125 in greater detail. As illustrated, the application programs 136 include a word processor program 302, an electronic book program 304, a spread sheet program 306 and an audio/text synchronization program 308 of the present invention. The electronic book program 304 is capable of accessing and presenting the content of audio and/or text files to the user of the computer system 120. In the case of synchronized text and audio files, the computer system 120 can switch between audio and text presentation modes or simultaneously provide audio corresponding to text being displayed.

The audio/text synchronization program 308 of the present invention can be used to generate synchronized audio and text files from unsynchronized audio and text files corresponding to the same informational content. For example, the audio/text synchronization program 308 can be used to generate synchronized audio and/or text versions of a literary work from unsynchronized audio and text versions of the work.

The audio/text synchronization program 308 of the present invention includes a plurality of modules which are used to generate the synchronized audio and/or text files from unsynchronized audio and text files. The modules include a control module 310, a speech recognizer module 312, a statistical language model generation module 314, optional speech recognition training module 316 and text/audio alignment module 318. The control module 310 is responsible for controlling the interaction of the various other modules which comprise the audio/text synchronization program 136 and is responsible for controlling the accessing and storage of audio and text files. The speech recognizer module 312 is used for performing speech recognition, as a function of a language model and an acoustic model. By performing a speech recognition operation, the speech recognizer module 312 generates a set of recognized text with time stamps from one or more audio files. The language model generation module 314 is used for generating, from a text corpus, a language model used by the speech recognizer 312. The optional speech recognition training module 316 is responsible, when used, for generating from a set of training data, the acoustic model used by the speech recognizer 312. In embodiments where the speech recognition training module 316 is not employed, a stored speaker independent acoustic model is used by the speech recognizer 312. The text/audio alignment module 318 is responsible for globally aligning recognized text with text in the text corpus 10 and for identifying points in the audio and text files where pointers should be added to the text and/or audio files for synchronizing purposes. The alignment module 318 is also responsible for aligning the audio and text files based on the identified alignment points, e.g., by inserting into the text and/or audio files time stamps or other markers which can be used as pointers between the audio and text files.

Figure 4:
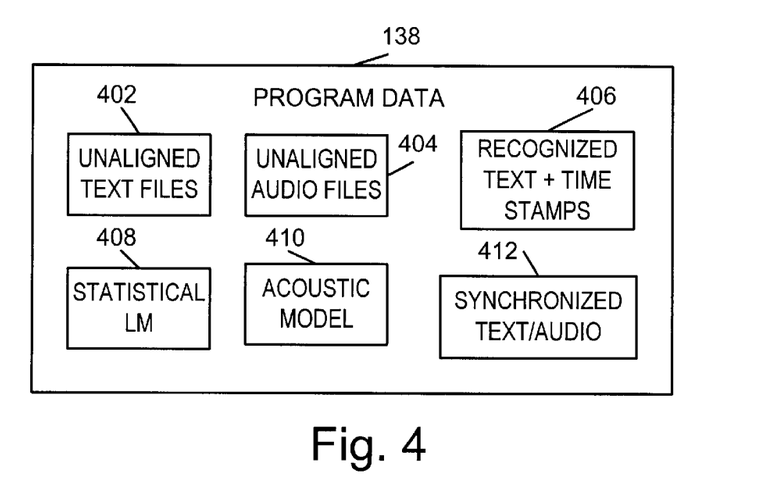
FIG. 4 illustrates a set of program data included in the computer system of FIG. 2.

FIG. 4 illustrates various sets of program data 138 used by the audio/text synchronization program 308 of the present invention. As illustrated, the program data 138 includes unaligned text files 402 which may include text files 12, 14. The program data 138 also includes unaligned audio files 404 which may include audio files 22, 24. The program data 130 also includes a speaker independent acoustic model 410 which serve as input to the audio/text synchronization program 308. A statistical language model 408, recognized text with time stamps 406, and synchronized text/audio files which are generated by the audio/text synchronization program 308 are also included in program data 138.

Figure 5:
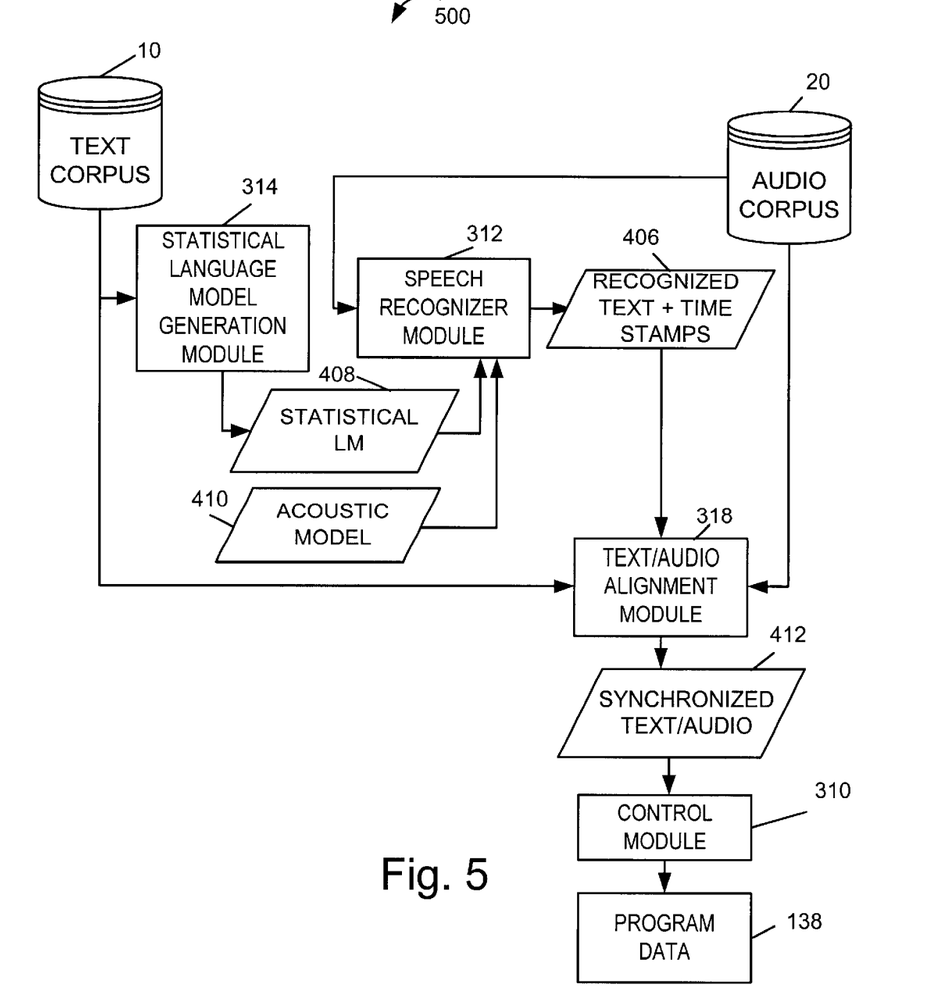
FIG. 5 illustrates the flow of data and information between various modules of the present invention.

FIG. 5 is a diagram 500 which illustrates the flow of data and information between various modules of the present invention. While modules implemented by executing software on a CPU are shown in FIG. 5, it is to be understood that one, several, or all of the illustrated modules may be replaced with one or more dedicated hardware circuits which perform the same functions as the illustrated modules. Accordingly, the present invention encompasses an embodiment wherein dedicated hardware circuits are used in place of each of the modules 314, 312, 318, 310 illustrated in FIG. 5.

The relationship between the various program modules which comprise the audio/text synchronization program 308, and the data used or generated by the program 308, will now be discussed with reference to FIG. 5.

As illustrated in FIG. 5, the corpus 10 of electronic text files, for which there is a corresponding corpus 20 of audio files, is supplied to the statistical language model generation module 314. Statistical language model generation module 314 is responsible for generating the statistical language model 408. The generated statistical language model 408 is supplied along with a speaker independent acoustic model 410 to the speech recognizer model 312. The speech recognizer module 312, generates from the audio corpus 20 a set 406 of recognized text which includes time stamps indicating the location within the audio corpus of the audio segment which corresponds to a recognized word.

The recognized text with time stamps, text corpus and audio corpus are then processed by the text/audio alignment module 318 to produce a set 412 of synchronized text and audio files which are stored under control of the control module 310. The set 412 of synchronized text and audio files may take any one of a plurality of forms as will be discussed below in regard to FIGS. 8–13.

As is known in the speech recognition art, a speech recognition operation is commonly performed using two models, an acoustic model and a language model. Acoustic model 410 and the language model 408 play an important role in the synchronization process of the present invention. The language model 408 is generated by the statistical language model generation module 314 in such a manner, e.g., as a finite state network, so as to allow it to be combined with the acoustic model 410 in a straight forward manner for speech recognition purposes.

The acoustic model 410 and the language model 408 are used to provide separate probabilities, which when combined, e.g., multiplied together, provide a joint probability that is used to determine the overall probability given an input acoustic sequence, that the sequence includes a particular hypothesized word or string of words. For a general discussion of the generation and use of acoustic models and language models in speech recognition applications see Lawrence Rabiner, Biing-Hwang Juang, *Fundamentals of Speech Recognition*, pp. 434–460 (Prentice Hall 1993).

As is known in the art, the acoustic model 410 estimates the probability, $P(Y|W)$, of a sequence of acoustic observations Y, conditioned on a hypothesized word string W. Silence is modeled as a word. The probability $P(Y|W)$ is commonly computed by building statistical unit models, e.g., phone models, for subword speech units, build up word models from these subword speech unit models, postulating possible word sequences and then evaluating the acoustic model probabilities via one or more known methods. Known methods of generating acoustic models based on phones involve training such models using a set of training data, e.g., a known set of spoken words, and phone representations of the known spoken words. The acoustic model generated using the training set of data is designed to maximize the probability that a spoken phone will be properly identified during subsequent use of the model for speech recognition purposes. When used, the speech recognition training module 316 can generate a speaker independent acoustic model from a set of training data including audio signals and text. U.S. Pat. No. 5,794,197 to Alleva et al. describes ways in which acoustic models suitable for use as the acoustic model 410 can be trained.

In the case of speaker independent acoustic models of the type used in accordance with the present invention, a relatively large set of training data from multiple speakers is normally used to generate the acoustic model. By using multiple speakers, and by considering different potential phone pronunciations of the same word, a relatively robust speaker independent acoustic model is generated. Given that the acoustic model 410 of the present invention may be generated using any one of a plurality of known techniques, prior to performing the text/audio synchronization process of the present invention, generation of the acoustic model will not be discussed further herein.

The language model 314, is used to estimate the probability P(W) associated with a hypothesized sequence of words (W). The language model can incorporate syntactic and/or semantic constraints. In the exemplary embodiment, the language model is generated using syntactic constraints in the form of an N-gram (N>1) word model where, in the exemplary embodiment N=3 resulting in tri-gram word models. N-gram word models are based on the statistical probability that a hypothesized word will occur based on the preceding (N-1) recognized words.

Unlike simple models, such as word pair models, which are simply a set of possible word pairs, statistical models can provide a more reliable recognition result given that they take into consideration more information than word pair models. Accordingly, when attempting to determine if a particular word sequence has occurred, e.g., for purposes of synchronizing audio and text files in accordance with the present invention, the recognition results of statistical models can be more reliable and useful than those of simple word pair models.

The language model constrains the possible words which may be recognized. In this way, it limits the words which are considered during speech recognition for hypothesis purposes to those which are possible in a given language or context. In the context of performing speech recognition on an audio corpus corresponding to a text corpus, it is useful to generate the language model 408 so that only those words found in the corresponding text corpus are potential candidates for recognition purposes. Accordingly, when synchronizing text and audio corpuses, in accordance with the invention, the language model 408 is generated from the text corpus being synchronized. Thus, words outside the text corpus are not considered as potential candidates for speech recognition purposes.

Figure 6:
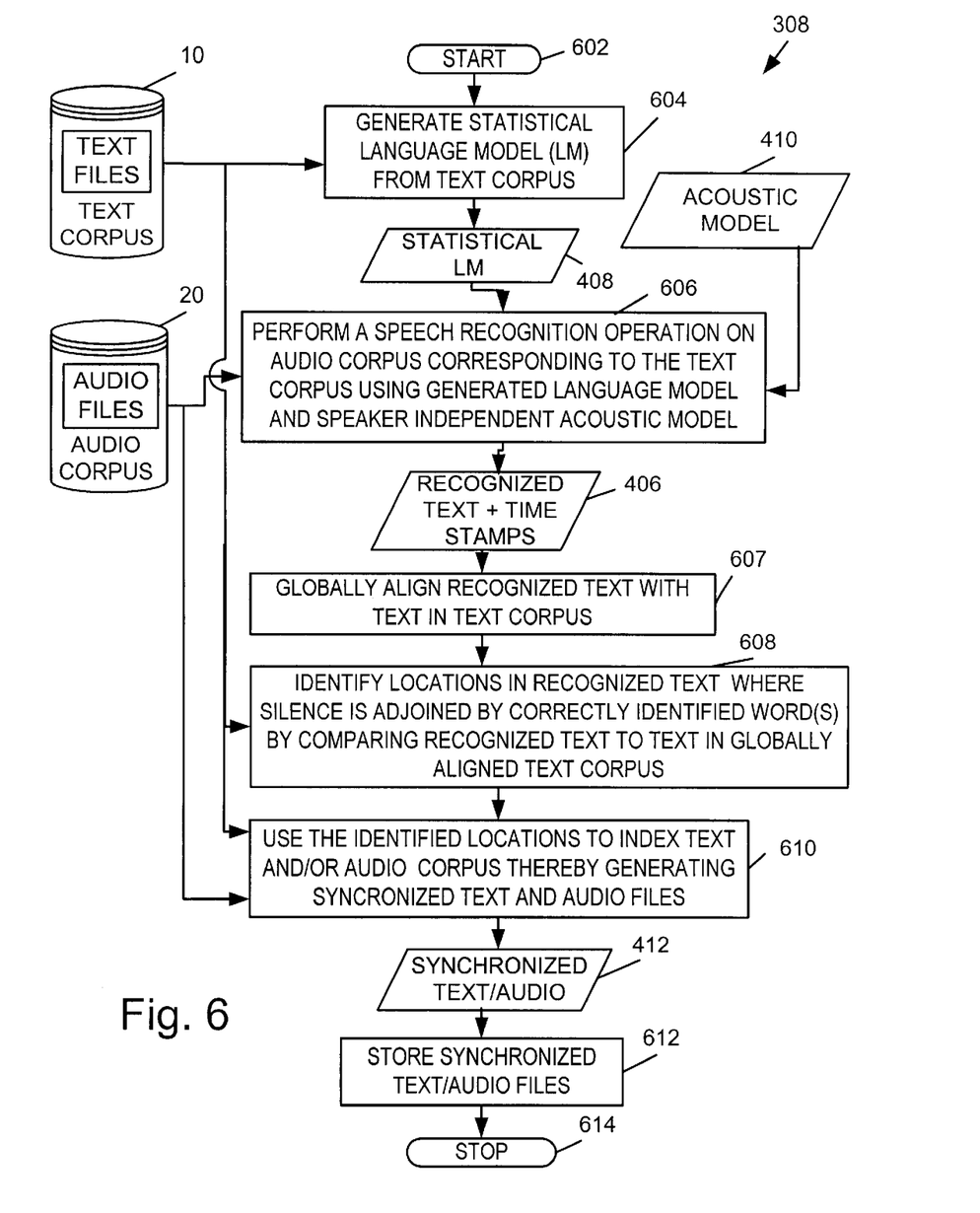
FIG. 6 is a flow diagram illustrating the steps of the present invention involved in synchronizing text and audio files.

The various steps performed by the audio/text synchronization program 308 of the present invention will now be explained in detail with reference to the flow chart of FIG. 6. Program 308 begins in step 602 wherein it is executed by the processor 121. Then in step 604, a statistical language model 408 is generated from the file or files which comprise the text corpus 10 being processed. As discussed above, the language model 408 may be generated using any one of a plurality of known techniques using language model generation module 314. As discussed above, in one exemplary embodiment, the language model 408 is a tri-gram language model.

From step 604 operation proceeds to step 606, wherein a speech recognition operation is performed on the audio corpus 20. The speech recognition operation is performed by speech recognizer module 312 which uses the statistical language model 408 and the speaker independent acoustic model 410 discussed above to perform the speech recognition operation. The result of performing a speech recognition operation in step 606 is the set of recognized text with time stamps 406. The time stamps serve as an index into the audio corpus 20 and mark the distance in playback time from the start of the audio corpus to the point being identified by the time stamp. Both start and stop time stamps may be included with the recognized text to indicate beginning and ending points of an audio segment which corresponds to a recognized word.

Figure 7:
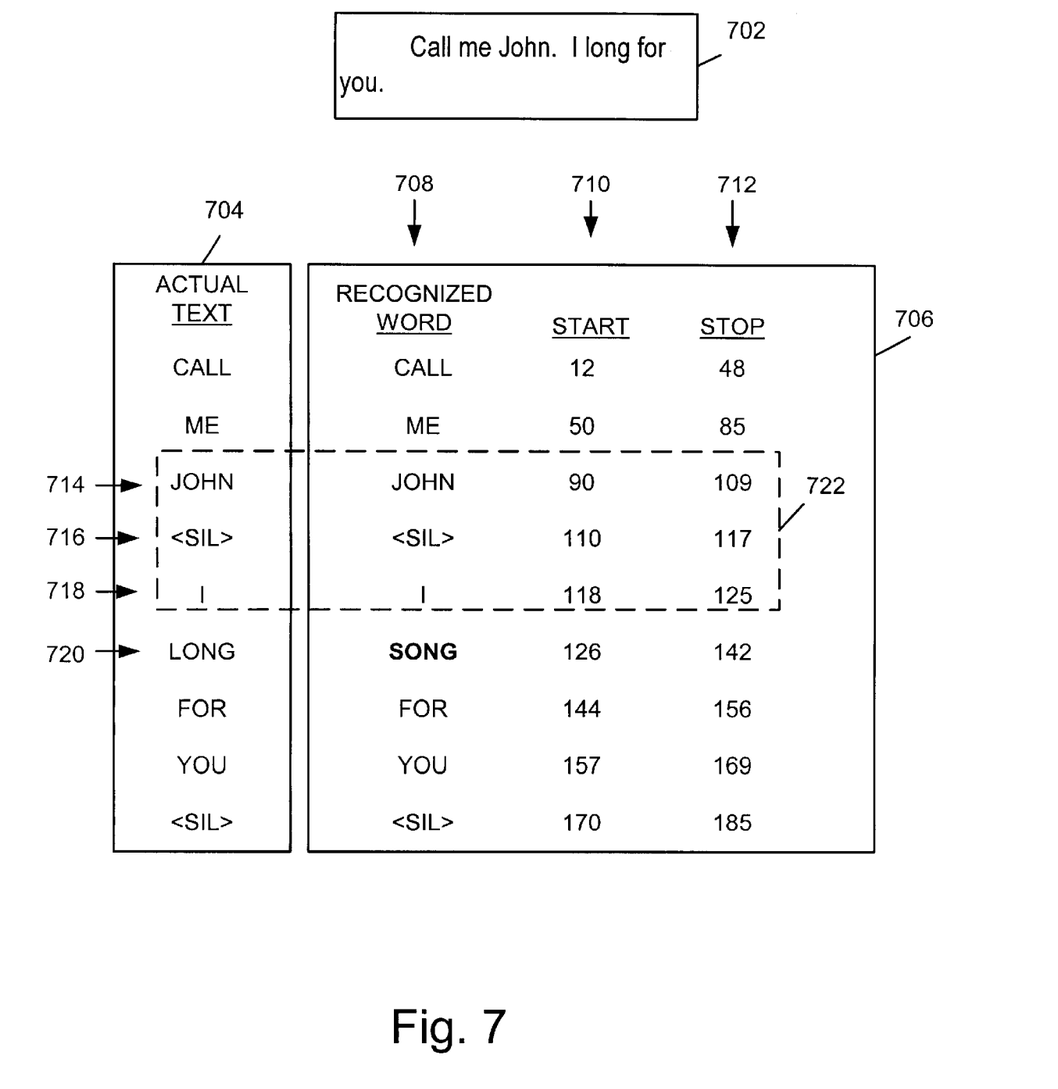
FIG. 7 illustrates an exemplary text corpus and the global alignment of the content of the text corpus with recognized speech.

Block 706 of FIG. 7 represents an exemplary set 406 of recognized text with time stamps that may be generated by the speech recognition operation of step 606. In block 707, the recognized word is listed in the first column 708 of block 706. The second and third columns 710, 712 of block 706 include the start and stop time stamps associated with each recognized word.

From step 606 of the audio/text synchronization program 308 operation proceeds to step 607 wherein the recognized text is aligned to the extent possible with the text in the text corpus. This may be accomplished by matching recognized words or sequences of recognized words in the recognized text to those found in the text corpus in such a manner that the number of matching words in the recognized text and text corpus is maximized.

In FIG. 7, text from an exemplary paragraph of a text corpus 10 is shown in block 702. Block 704 shows the actual text with <SIL>being substituted for punctuation, e.g., period, which would cause a speaker to insert silence in the text when read aloud. Placement of the recognized text 706 side by side with the actual text 704 represents the global alignment of the actual and recognized text performed in step 607. Rows 714, 716, 718 and 720 correspond to aligned words. Note that the actual text 704 is aligned with the recognized text 708 so that in the illustrated sequence only one miss-match occurs, i.e., the words in row 720, LONG, and SONG do not match. The mismatch in row 720 corresponds to a recognition error where the word song was mistakenly identified in place of the word long.

From global alignment step 607, operation proceeds to step 608 wherein locations in the recognized text where silence preceded and/or followed by correctly recognized words are identified. As discussed above, in the case of audio versions of literary works and other works read allowed and recorded for commercial distribution purposes, silence is often a particularly easy to recognize since the recordings are often made in a sound studio with limited background noise. Since silence normally occurs at the ends of sentences and paragraphs, and it is these points which are of particular interest for the insertion of pointers for the purposes of text and audio synchronization, identifying points where silence occurs as potential locations where a pointer may be inserted is particularly useful.

In one particular exemplary embodiment, for a pointer to be inserted into the text and/or audio for synchronization purposes, the recognized text, bracketing the identified point of silence must have been correctly identified. In other words, in the particular embodiment both the word preceding and subsequent to the period of silence must have been correctly recognized. Whether a word was correctly recognized is determined in step 608 by comparing the words of interest in recognized text with the aligned words in the actual text and determining if they match.

In row 716 of FIG. 7, it can be seen that a period of silence was recognized in the audio file starting at time stamp 110 and ending at time stamp 117. By comparing the recognized word JOHN preceding the recognized silence, to the word preceding the silence in the aligned actual text 704, it can be seen that the word JOHN was correctly recognized. By comparing the recognized word I, following the recognized silence, to the word following the silence in the aligned text 704, it can be seen that the word I was also correctly recognized. Since the words preceding and following the silence were correctly recognized, the silence defined by audio time stamps 110, 117 would be identified in step 608 as a point where the audio and text files should be synchronized. File synchronization can be accomplished by, e.g., adding a bi-directional pointer linking the text and audio files, to the text files, and, optionally, to the audio files. By adding a pointer at the identified aligned location corresponding to silence, in this case the audio and text files will be synchronized at the start of a sentence.

In the particular exemplary embodiment described above where both words bracketing silence must be correctly recognized for the point of silence to be used for file synchronization purposes, if silence was recognized adjacent the miss-recognized word, SONG, the recognized silence would not be identified in step 608 for synchronization purposes.

From step 608 operation proceeds to step 610, wherein the locations identified in step 608, for file synchronization purposes, are used to index the text and/or audio corpus. The indexing of the files may be performed in a plurality of ways.

One way to index the audio and text files is to add audio time stamps to the corresponding identified locations in the text file, e.g., the points where the punctuation corresponding to the identified periods of silence are located. Such time stamp values may identify the position from the start of the audio file where the detected silence being indexed starts or stops. Thus, in accordance with the present invention audio time stamps or other pointers into an audio file may also be inserted in a text file for synchronization purposes. If the audio file does not already include such time stamps, they may be inserted into the corresponding audio file to facilitate file synchronization as well. Incorporation of audio time stamps into the audio file is optional since these may be calculated on the fly from the audio file in a relatively short amount of time. By incorporating audio time stamps into the text and, optionally, the corresponding audio file, accessing the same point in both the audio and text versions becomes a simple matter of searching the text and/or audio file for a particular, e.g., corresponding, audio time stamp.

The synchronized text and audio files 412 generated in step 610 may take any one of several forms as will be discussed below in regard to FIGS. 8–13. After the set 412 of synchronized audio and text files is generated, in step 612 it is stored in memory under the direction of the control module 310.

With the storing of the synchronized set 412 of audio and text files, the audio/text synchronization program 338 is stopped in step 614 pending its re-execution to process another set of unsynchronized audio and text corpuses.

Figure 8:
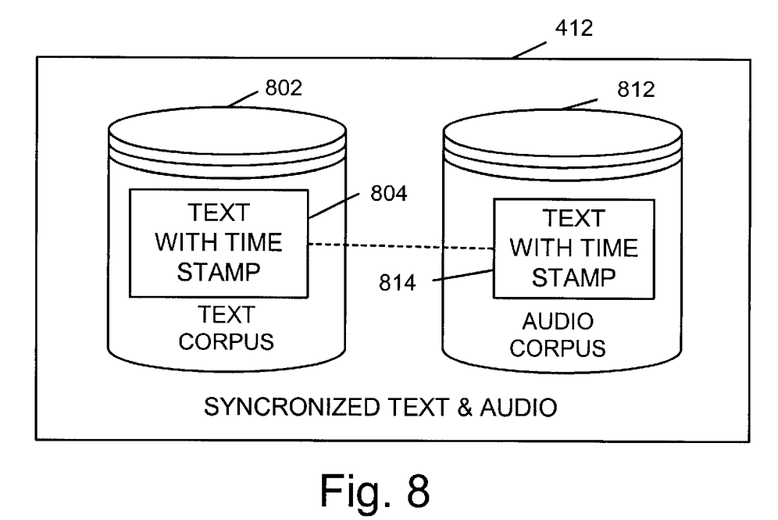
FIGS. 8, 10 and 12 illustrate exemplary synchronized text and audio corpuses created in accordance with various embodiments of the present invention.

Various formats for the generated set 412 of synchronized audio and text files will now be described with reference to FIGS. 8–13. FIG. 8 illustrates a set 412 of synchronized text and audio files corresponding to the same exemplary literary work. In the FIG. 8 embodiment, a single text file 804, including time stamps, is used to represent the text corpus 802. A single audio file 814 which includes the same time stamps as text file 804, is used to represent the audio corpus 812. The dashed line between the text and audio files 804, 814 represents the linking of the audio and text files through the use of common time stamps.

Figure 9:
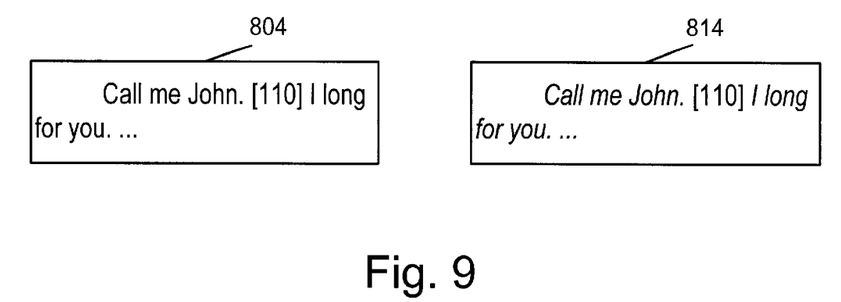
FIGS. 9, 11 and 13 illustrate exemplary content of the aligned audio and text corpuses shown in FIGS. 8, 10 and 12, respectively.

FIG. 9 shows a portion of the text file 804. Note that the time stamp [110], corresponding to the start of the silence detected in row 716 of the set of exemplary recognized text, has been inserted before the word I as a pointer into the audio file 814. In FIG. 9 italicized text is used to represent audio signals, e.g., speech, corresponding to the text. Note that in the audio file 814, the time stamp [110] has been inserted at the point where silence starts between the words John and I. Since the pointer [110] is located from a content perspective at the same position in the audio and text files 804, 814, the pointer serves to synchronize the audio and text files in accordance with the present invention.

Figure 10:
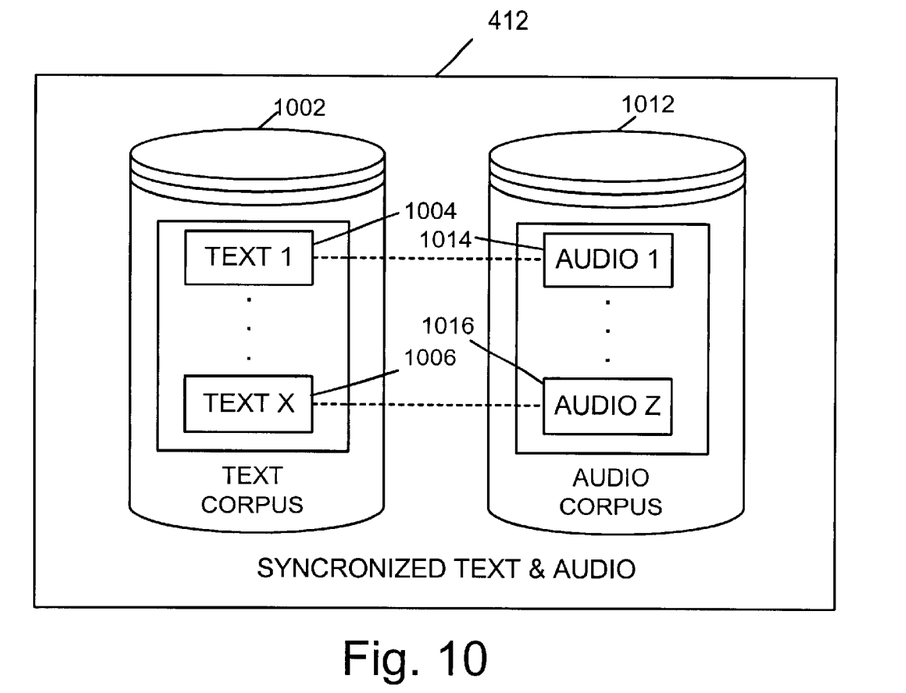
Figure 11:
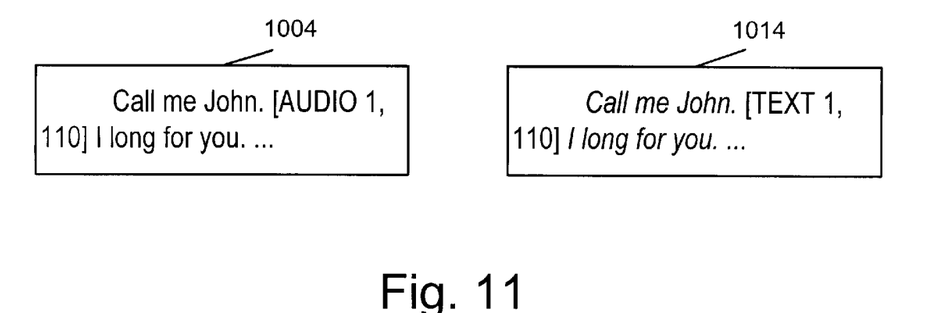
Figure 12:
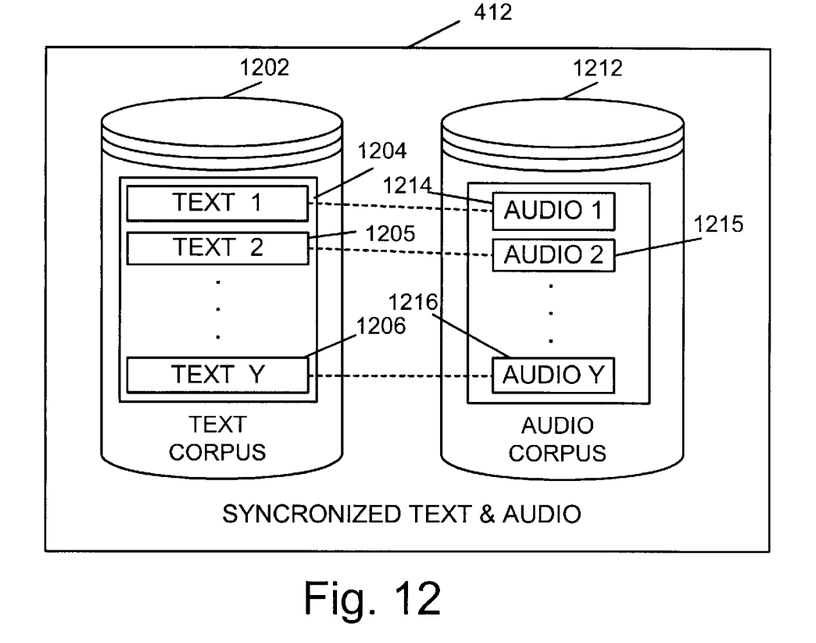

FIG. 10 illustrates an embodiment where the set 412 of synchronized text and audio files includes a text corpus 1002 and an audio corpus 1012. The text corpus 1002 comprises multiple text files 1004, 1006 while the audio corpus 1012 comprises multiple audio files 1014, 1016. The X number of audio files 1004, 1006 may be different than the Z number of audio files 1014, 1016. In the FIG. 10 embodiment, at points identified for synchronization purposes, pointers are included in the text and audio files. As illustrated in FIG. 11, in the pointers in the text file 1004 include a file identifier, e.g., the name AUDIO 1, of the audio file being pointed to and a time index, e.g., 110, used to access a specific location within the audio file. In a similar fashion, the pointers in the audio file 1014 include a file identifier, e.g., the name TEXT 1, of the text file being pointed to and a time index, e.g., 110, used to access the specific location within the text file.

Figure 13:
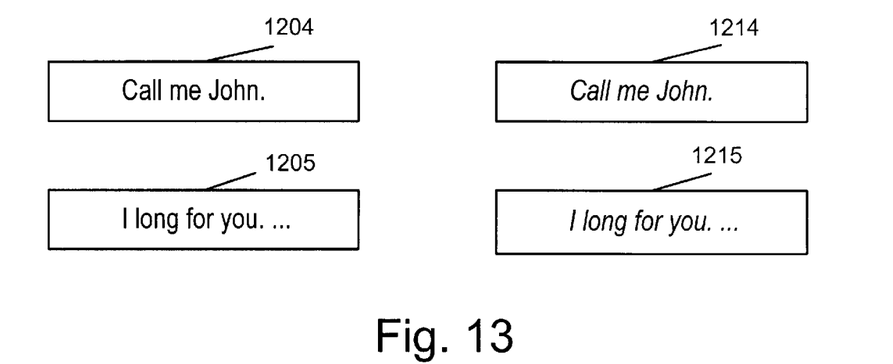

Rather than incorporate pointers into the audio and text files, in step 610, the text corpus 1202 may be divided into the same number Y of files as the audio corpus 1212. This produces a text corpus 1202 having Y text files 1204, 1205, 1206 and an audio corpus 1212 also with Y files 1214, 1215, 1216. In the FIG. 12 embodiment, text file, TEXT n, includes the same content as audio file, AUDIO n, albeit in a different format, e.g., audio vs. text format. In such an embodiment, the file number which forms part of the file name serves as an index to identify the corresponding audio or text file. In the FIG. 12 embodiment, each point of silence identified to be used for synchronization purposes would mark the start of a new file. Such an embodiment may result in, e.g., an audio and text file for each sentence or paragraph. FIG. 13 illustrates exemplary text files 1204 and 1205 as well as corresponding exemplary audio files 1214, 1215. Note that the audio files 1204, 1205 and text 1214, 1215 files are split at the point where silence was detected bracketed by properly identified words. Note also that text file, TEXT 1 1204, includes the same information content as audio file, AUDIO 1 1214.

A wide variety of other formats for the set 412 of synchronized audio and text data generated in accordance with the present invention are also possible. For example, the synchronized audio and text data could be stored in a single file with links, e.g., pointers, synchronizing portions of the audio and text data which have been found to correspond to each other.

While the above information has been described primarily in terms of its ability to be used to synchronize audio and text data corresponding to literary works, it is to be understood that it can also be used in a wide variety of other applications where audio and text data representing different expressions of the same information need to be synchronized. Accordingly, the methods of the present invention can be used, e.g., to synchronize transcripts of audio information with the audio version of the information.

Various exemplary embodiments have been described above. In view of the description provided above, various modifications will be apparent to those skilled in the art without deviating from the inventive teachings described and claimed herein.

What is claimed is:

1. A method of processing audio data and text data comprising:
   operating a speech recognizer device to perform a speech recognition operation on the audio data to produce a set of recognized text;
   globally aligning the recognized text with words included in the text data;
   identifying a first location in the recognized text where silence was recognized and where at least one correctly recognized word adjoins the recognized silence; and
   inserting into the text data, at the location aligned with said first identified location, a pointer to the audio data corresponding to the recognized silence.

2. The method of claim 1,
   where the first identified location is a location in the recognized text where silence is expected to occur based on information included in the aligned text data, the method further comprising:
   identifying an additional location in the recognized text where silence was recognized and additional silence was expected to occur based on information included in the aligned text data and where at least one correctly recognized word adjoins the additional recognized silence; and
   inserting into the text data, at the location aligned with said additional identified location, a pointer to the audio data corresponding to the additional recognized silence.

3. The method of claim 1, wherein identifying a first location includes the act of determining if two correctly identified words adjoin the recognized silence.

4. The method of claim 3, wherein determining if two correctly identified words adjoin the recognized silence includes the act of:
   comparing a first word in the recognized text adjoining and preceding the recognized silence to a corresponding word in the aligned text data to determine if the first word was correctly recognized.

5. The method of claim 4, wherein determining if two correctly identified words adjoin the recognized silence further includes the act of:
   comparing a second word in the recognized text adjoining and following the recognized silence to a corresponding word in the aligned text data to determine if the second word was correctly recognized.

6. The method of claim 3, wherein determining if two correctly identified words adjoin the recognized silence includes the act of:
   comparing two consecutive words in the recognized text adjoining and preceding the recognized silence to two corresponding consecutive words in the aligned text data to determine if the two consecutive words in the recognized text were correctly recognized.

7. The method of claim 3, wherein determining if two correctly identified words adjoin the recognized silence includes the act of:
   comparing two consecutive words in the recognized text adjoining and following the recognized silence to two corresponding consecutive words in the aligned text data to determine if the two consecutive words in the recognized text were correctly recognized.

8. The method of claim 3, wherein operating a speech recognizer apparatus to perform a speech recognition operation includes the act of:
   operating the speech recognizer to generate time indexes into the audio data corresponding to the locations of audio data recognized as silence.

9. The method of claim 8, wherein inserting into the text data a pointer to the audio data includes the act of:
   inserting as the pointer, a time index into the audio data corresponding to the recognized period of silence.

10. The method of claim 9, further comprising:
    inserting into the audio data the same time index inserted into the text data.

11. The method of claim 9, further comprising the step of:
    storing the text data including the inserted time stamp in a data storage device.

12. The method of claim 11, further comprising:
operating a computer device to read the time stamp in the stored text file and to access the audio data using the time stamp as an index into the audio file.

13. The method of claim 1, wherein said audio data and text data are audio and text versions of the same literary work.

14. The method of claim 13, wherein the pointer includes an audio time stamp.

15. The method of claim 13, wherein the pointer includes an audio file identifier and a value used to index the identified audio file.

16. The method of claim 8, further comprising:
generating a statistical language model from the text data; and
wherein operating a speech recognizer includes the act of:
using the statistical language model and a speaker independent acoustic model to recognize words and silence in the text data.

17. The method of claim 1, further comprising:
generating a statistical language model from the text data.

18. The method of claim 17, wherein operating a speech recognizer includes the act of:
using the statistical language model and a speaker independent acoustic model to recognize words and silence in the text data.

19. The method of claim 1, wherein inserting a pointer into the text data includes the act of:
operating a computer device to add the pointer to the text data.

20. The method of claim 19, further comprising:
storing the text data including the inserted pointer in a data storage device.

21. A computer readable medium, comprising:
computer executable instructions for controlling a computer device to process audio data and text data said processing including:
performing a speech recognition operation on the audio data to produce a set of recognized text;
globally aligning the recognized text with words included in the text data;
identifying a first location in the recognized text where silence was recognized and where at least one correctly recognized word adjoins the recognized silence; and
inserting into the text data, at the location aligned with said first identified location, a pointer to the audio data corresponding to the recognized silence.

22. A method of processing audio data and text data comprising:
operating a speech recognizer device to perform a speech recognition operation on the audio data to produce a set of recognized text;
globally aligning the recognized text with words included in the text data;
identifying a location in the recognized text where silence was recognized and where at least one correctly recognized word adjoins the recognized silence; and
segmenting the audio and text data into multiple audio and data files including corresponding informational content, as a function of the location in the recognized text corresponding to the identified recognized silence, and the location of the identified recognized silence in the audio data.

23. The method of claim 22, wherein performing a speech recognition operation includes the act of:
generating a statistical language model from the text data.

24. The method of claim 23, wherein performing a speech recognition operation further includes the act of:
using the statistical language model and a speaker independent acoustic model to recognize words in the text data.

25. A method of synchronizing audio data and text data comprising:
operating a speech recognizer device to perform a speech recognition operation on the audio data to produce a set of recognized text;
aligning the recognized text with words included in the text data;
identifying a location in the recognized text where silence was recognized and where the silence is preceded and followed by at least one correctly recognized word; and
inserting into the text data, at a location in the text data corresponding to the identified location in the recognized text, a pointer to the audio data corresponding to the recognized silence.

26. The method of claim 25, further comprising:
generating a statistical language model from the text data; and
supplying the statistical language model to the speech recognizer.

27. The method of claim 26, wherein operating a speech recognizer to perform a speech recognition operation includes the act of:
operating the speech recognizer to use the statistical language model and a speaker independent acoustic model to recognize words in the audio data.

28. The method of claim 27,
wherein the step of operating a speech recognizer to perform a speech recognition operation further includes the act of:
operating the speech recognizer to generate audio time stamps identifying the locations within the audio data of the recognized words and silence; and
wherein inserting a pointer into the text data includes the act of:
inserting one of the generated audio time stamps as the pointer.

29. The method of claim 27, wherein the statistical language model is an N-gram language model where N is an integer greater than one.

30. A computer readable medium, comprising:
computer executable instructions for controlling a computer device to process audio data and text data said processing including:
aligning the recognized text with words included in the text data;
performing a speech recognition operation on the audio data to produce a set of recognized text;
aligning the recognized text with words included in the text data;
identifying a location in the recognized text where silence was recognized and where the silence is preceded and followed by at least one correctly recognized word; and inserting into the text data, at a location in the text data corresponding to the identified location in the recognized text, a pointer to the audio data corresponding to the recognized silence.

31. A device for processing electronic text data and electronic audio data, comprising:

a speech recognizer for performing a speech recognition operation on the audio data to produce a set of recognized text;

means for globally aligning the recognized text with words included in the text data;

means for identifying a first location in the recognized text where silence was recognized and where at least one correctly recognized word adjoins the recognized silence; and means for inserting into the text data, at the location aligned with said first identified location, a pointer to the audio data corresponding to the recognized silence.

32. The system of claim 31, further comprising:

a statistical language model generation module coupled to the speech recognizer for generating from the text data a statistical language model used by the speech recognizer when performing a speech recognition operation on the audio data.

33. The system of claim 32, further comprising:

a speaker independent acoustic model used by the speech recognizer when performing a speech recognition operation on the audio data.

34. The system of claim 31, wherein the statistical language model generation module generates N-gram models, where N is an integer greater than two.

35. The system of claim 31, wherein the means for identifying a first location in the recognized text includes computer instructions for identifying recognized periods of silence bracketed by correctly recognized words.

36. The device of claim 31, wherein the audio data and text data correspond to the same literary work, the device further comprising:

a display;

an audio output system; and means for simultaneously presenting the audio data via the audio output system and the text data via the display in a synchronized manner using the inserted pointer.

* * * * *

UNITED STATES PATENT AND TRADEMARK OFFICE
CERTIFICATE OF CORRECTION

PATENT NO. : 6,260,011 B1
DATED : July 10, 2001
INVENTOR(S) : Heckerman et al.

It is certified that error appears in the above-identified patent and that said Letters Patent is hereby corrected as shown below:

<u>Column 16,</u>
Line 58, delete "aligning the recognized text with the words included in the text data;"

Signed and Sealed this

Thirteenth Day of August, 2002

*Attest:*

*Attesting Officer*

JAMES E. ROGAN
*Director of the United States Patent and Trademark Office*